Sept. 15, 1959 R. E. GREENOUGH 2,904,136
ANTISKID BRAKE MECHANISM
Filed April 18, 1955 3 Sheets-Sheet 1

INVENTOR.
RAYMOND E. GREENOUGH
BY
ATTORNEY

Sept. 15, 1959  R. E. GREENOUGH  2,904,136
ANTISKID BRAKE MECHANISM

Filed April 18, 1955  3 Sheets-Sheet 2

INVENTOR.
RAYMOND E. GREENOUGH
BY
ATTORNEY

Sept. 15, 1959   R. E. GREENOUGH   2,904,136
ANTISKID BRAKE MECHANISM

Filed April 18, 1955   3 Sheets-Sheet 3

INVENTOR.
RAYMOND E. GREENOUGH
BY
ATTORNEY

United States Patent Office 2,904,136
Patented Sept. 15, 1959

2,904,136

ANTISKID BRAKE MECHANISM

Raymond E. Greenough, Berea, Ohio, assignor to Cleveland Pneumatic Industries, Inc., a corporation of Ohio Application April 18, 1955, Serial No. 501,939

1 Claim. (Cl. 188—181)

This invention relates to brake systems and more particularly to a new and improved antiskid brake system adapted for use on aircraft.

It is an important object of this invention to provide a new and improved brake system of the antiskid type for use in aircraft installations.

It is another important object of this invention to provide an aircraft brake system which automatically releases the brakes when skidding of the wheels occurs wherein the brake mounting is resilient to limit the violence of the reactions.

It is still another object of this invention to provide a new and improved antiskid mechanism for aircraft installations.

Further objects and advantages will appear from the following description and drawings, wherein.

Figure 1:
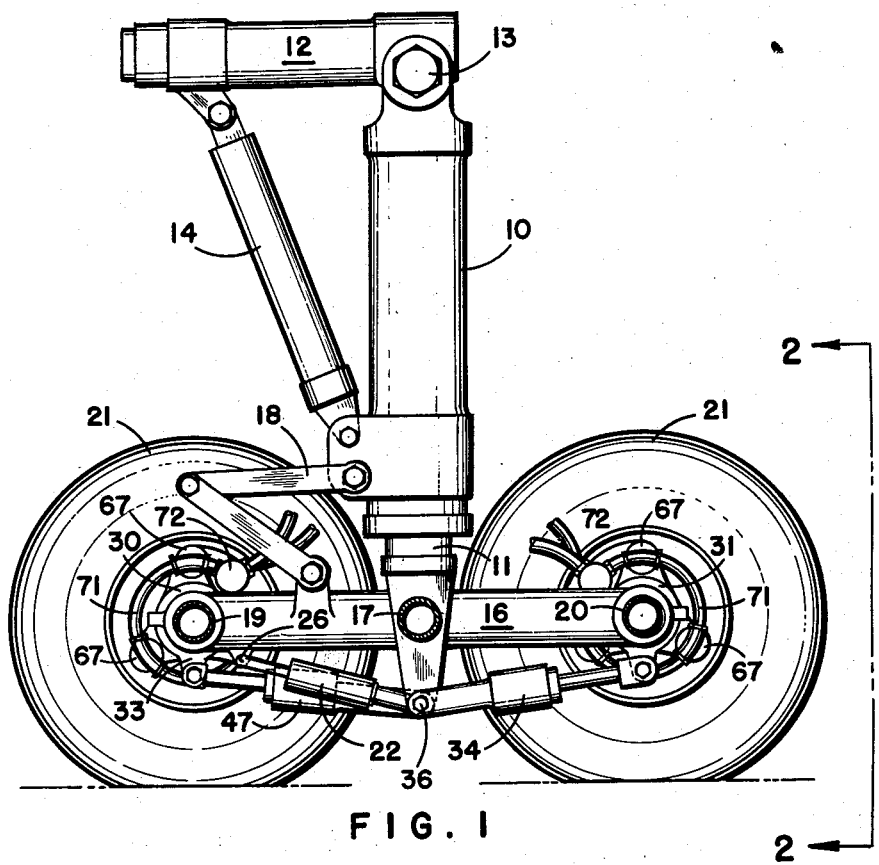
Figure 1 is a side elevation partially in section showing an aircraft landing gear incorporating a brake system according to this invention.
Figure 2:
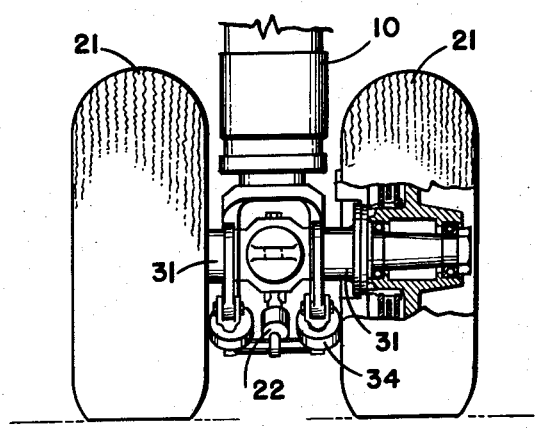
Figure 2 is a view taken along 2—2 of Figure 1.

For a clear understanding of this invention, reference should be made to the drawings wherein a landing gear is shown in Figure 1 which incorporates an upper telescoping member 10 and a lower telescoping member 11. The upper telescoping member 10 is connected to a lateral member 12 by a cross pin 13. The lateral member 12 is adapted to be connected to the frame of the aircraft and a solid brace link 14 is connected between the lateral member 12 and the upper telescoping member 10 to provide lateral support for the upper telescoping member 10. The upper and lower telescoping members 10 and 11 are provided with an air-oil spring (not shown) of conventional design which resiliently urges the lower telescoping member 11 downward relative to the upper telescoping member 10 and which supports the static load of the aircraft when it is on the ground. A cross beam 16 is pivotly connected to the lower telescoping member 11 by a cross pin 17 so that it may rotate relative to the lower telescoping member 11. Torque arms 18 are connected between the cross beam 16 and the upper telescoping member 10 to prevent rotation of the lower telescoping member 11 and the cross beam 16 around the axis of the telescoping members. A forward axle 19 and a rearward axle 20 are mounted on the cross beam 16 on either side of the lower telescoping member 11 and provide means for mounting four wheels 21, one of which is mounted on each axle or either side of the cross beam 16.

Figure 8:
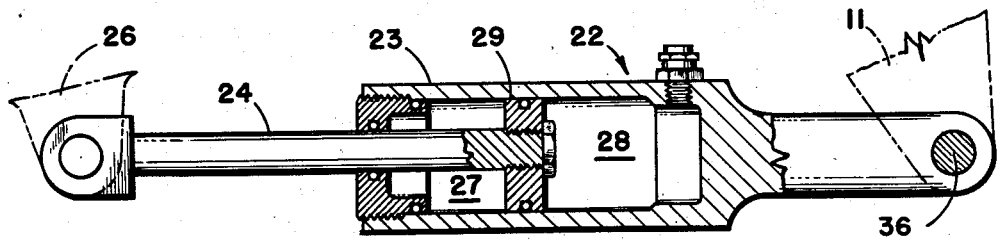

A centering spring 22 is connected between the lower end of the lower telescoping member 11 and the cross beam 16 to insure that the cross beam is properly oriented relative to the lower telescoping member 11 prior to the landing of the aircraft. The preferred centering spring (see Figure 8) provides a cylinder 23 pivotally connected to the lower telescoping member 11 at one end and a piston assembly 24 pivotally connected to a boss 26 formed on the cross beam 16. The cavity within the cylinder 23 is divided into two chambers 27 and 28 by a piston head 29 which forms the end of the piston assembly 24. A gas under pressure is introduced into the two chambers 27 and 28 at a pressure arranged so that the piston assembly will always tend to return to the neutral position shown in Figure 8. If the piston assembly 24 moves from the position shown, there will be a build up of pressure in one of the chambers which will urge the piston back to the initial position. Preferably, the structural proportions should be arranged so that when the piston assembly 24 is in the neutral position, the cross beam 16 is positioned with the axle 20 slightly lower than the axle 19. This insures that in a landing the rear wheels will engage the ground slightly before the forward wheels.

Mounted on the axle 19 between each of the wheels 21 and the cross beam 16 are two similar front brake mounting members 30 and mounted on the axle 20 are two similar rear brake mounting members 31. Bearings 32 axially locate each of the mounting members 30 and 31 on the axle but permit rotation thereof around the axis of the axle. A boss 33 on each of the mounting members 30 and 31 serves as a pivot mounting for one end of a liquid spring used to resiliently resist rotation thereof in one direction.

Figure 6:
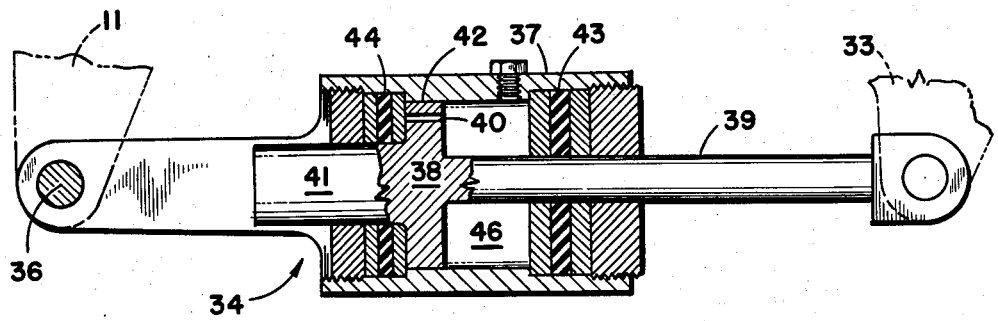
Figure 6 is a side elevation in longitudinal section of the liquid spring utilized to resiliently anchor the rearward brake mechanism.

Tension liquid springs 34 are pivotally mounted on each of the bosses 33 of the rear mounting members 31 and a pivot pin 36 on the lower telescoping member 11 so that they resist rotation of the mounting members 31 relative to the axle 20 in a counter-clockwise direction (see Figure 1). As shown in Figure 6, each of the liquid springs 34 is provided with a cylindrical housing 37 and a piston 38. The piston 38 is provided with a shaft portion 39 on one end which is connected to the boss 33 and a second larger shaft portion 41 on the other end. A damping piston head 42 between the shaft portions 39 and 41 extends into engagement with the inner surface of the cylinder assembly 37 and is formed with damping orifices 40 to control the velocity of relative motion between the piston assembly 38 and the housing 37. Suitable seals 43 and 44 engage the shaft portions 39 and 41 respectively to prevent leakage of liquid from the chamber 46 within the cylinder housing 37. The chamber 46 is completely filled with liquid when the liquid spring 34 is in the compressed position shown in Figure 6. In some cases the liquid within the chamber 46 is introduced under pressure when the spring is in the compressed position. However, this is merely a function of design determined by the desired spring rate and operation. When the piston 38 is moved axially to the right, the volume of chamber 46 is reduced due to the differential cross sections of the shaft portions 39 and 41. This compresses the liquid and increases its pressure which in turn results in a resilient reaction force urging the piston 38 to the left to its initial compressed position.

In operation, when the aircraft is moving forward, in the direction of the left as shown in Figure 1, the wheels 21 rotate in a counter-clockwise direction. When the brakes are applied to resist rotation of the wheels 21 in the counter-clockwise direction, as will be discussed in detail below, the mounting member will rotate with the wheels in the counter-clockwise direction. This counter-clockwise rotation of the mounting members 31 is resisted in the case of the rear mounting members 31 by the liquid springs 34. It should be understood that each of the rearward mounting members 31 is provided with a liquid spring to individually resist rotation thereof.

Figure 7:
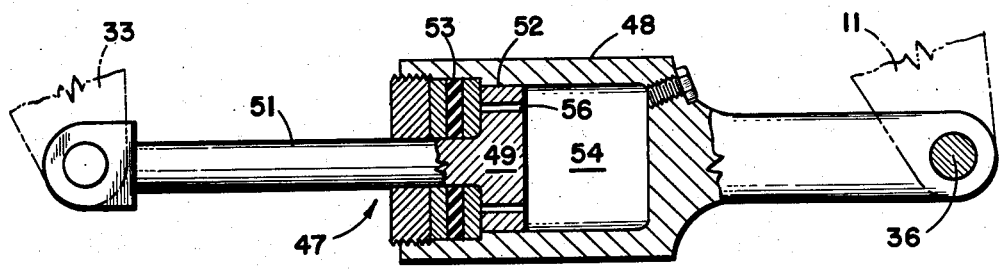
Figure 7 is a side elevation in longitudinal section of the compression liquid spring utilized to resiliently anchor the forward brake mechanism; and, Figure 8 is a side elevation in longitudinal section of the centering spring utilized to insure a proper attack angle before landing.

In order to resist rotation of the forward mounting members 30, compression liquid springs 47 are provided which extend between the bosses 33 of the forward mounting member 30 and the pivot pin 36. As shown in Figure 7, the liquid springs 47 are provided with cylinder members 48 and piston members 49 wherein the piston member is only formed with a single shaft portion 51 and a head portion 52 at one end thereof. Again a suitable seal 53 prevents fluid leakage along the shaft portion 51. A chamber 54 defined by the cylinder member 48 is filled with liquid when the piston 49 is in the extended position shown. Here again the liquid may be under pressure when the elements are in the extended position depending upon the desired spring rate of the liquid springs 47. Any movement of the piston 49 to the right (as shown in Figure 7) into the chamber 54 reduces the volume thereof by the amount displaced by shaft portion 51. This reduction of volume in turn compresses the liquid and increases the pressure within the chamber thus producing a resilient reaction force urging the piston 49 back to its extended position. It is apparent, therefore, that the liquid springs 47 resist rotational movement of the forward mounting members 30 in a counter-clockwise direction in the same manner as the liquid springs 34 resist rotation of the mounting members 31. The liquid springs 47 are also provided with damping orifices 56 in their piston heads to dampen out any violent axial motion of the respective pistons. A limited amount of counter-clockwise rotation of the mounting members 30 and 31 is possible in all cases due to the resiliency of the liquid springs 34 and 47.

Figure 3:
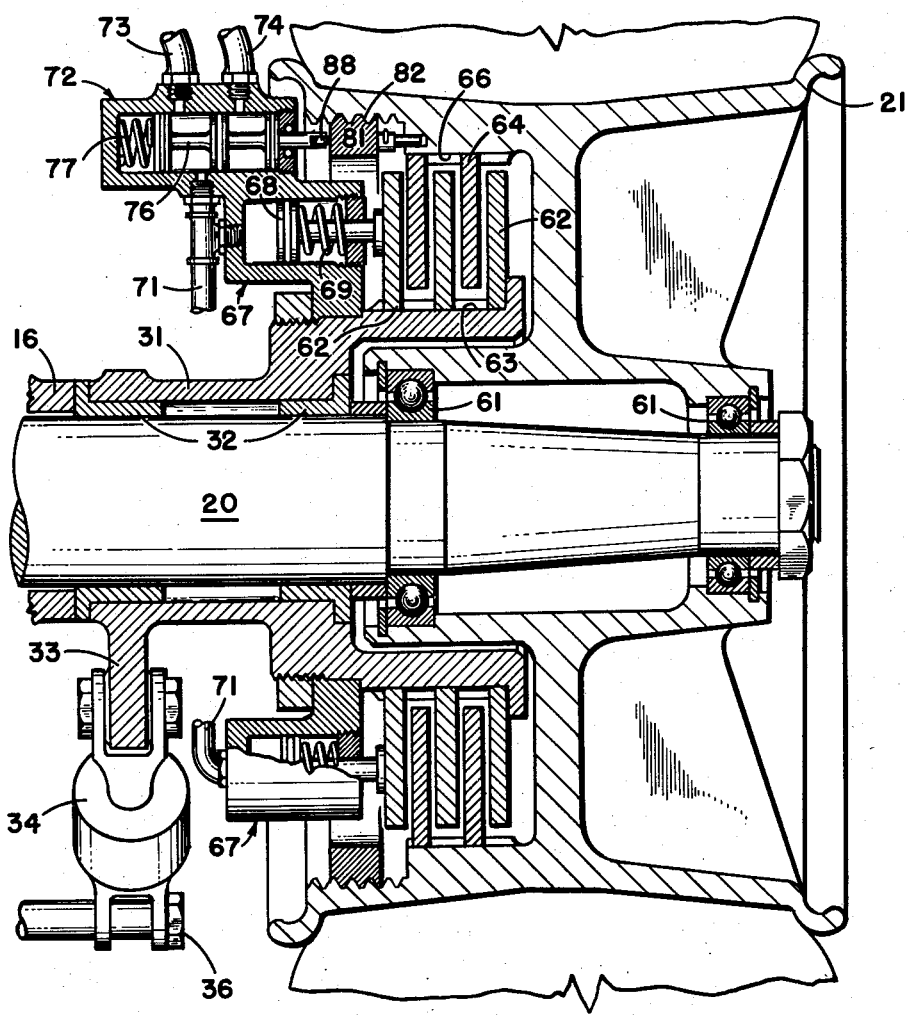
Figure 3 is an enlarged fragmentary cross section showing the details of the antiskid mechanism and the brake structure.
Figure 4:
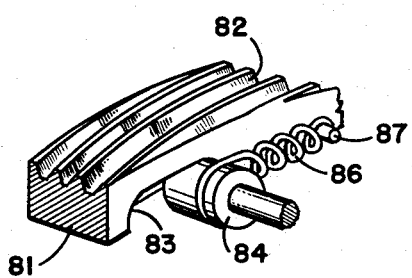
Figure 4 is a fragmentary perspective view of the inertia mechanism utilized to sense the skidding of the wheel.
Figure 5:
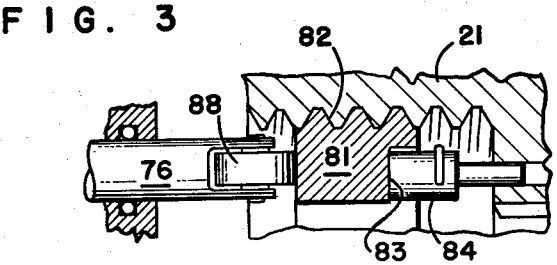
Figure 5 is an enlarged fragmentary cross section of the skid sensing mechanism.

Reference should now be made to Figures 3, 4 and 5 for the structure of the brake mechanism and the mounting of the wheels on the axles. Figure 3 is a detailed cross section of the brake mechanism and wheel mounting of one of the rearward wheels 21; however, each of the wheels are provided with a similar structure so the discussion of one of the brake structures applies to all the rest. Antifriction bearings 61 extend between the wheels 21 and the axle 20 and permit rotation of the wheels 21 but prevent axial motion thereof relative to the axle. A brake mechanism on the mounting member 31 is provided to resist rotation of the wheels 21 relative to the mounting member 31 when the brake mechanism is operated. A plurality of radially extending inner brake discs 62 are mounted on the mounting member 31 by a spline connection 63 so that they can move axially relative to the mounting member 31 but are restrained against relative rotation. Interspaced between the brake discs 62 are a plurality of outer brake discs 64 which are connected to the wheel 21 by a spline connection 66 which permits relative axial motion but prevents relative rotational motion.

Mounted on the mounting member 31 are a plurality of circumferentially spaced operating cylinders 67 each provided with a fluid actuated piston 68. The outer end of each piston engages one of the end inner brake discs and is capable of urging it axially to the right when fluid under pressure is introduced into the cylinders. Of course, this axial motion of the inner brake discs clamps the outer brake discs and produces friction force resisting relative rotation between the outer brake disc 64 and the inner brake disc 62 which in turn resists relative rotation between the wheel 21 and the mounting member 31. A spring 69 urges the piston 68 to the left when fluid pressure is not supplied to the cylinder 67. A manifold 71 connecting each of the cylinders 67 to a spool valve 72 which in turn is provided with two ports, one of which is connected to a source of brake fluid under pressure by a first flexible hose 73 and the other of which is connected to the brake fluid reservoir by a second flexible hose 74. The reservoir and pressure system which operates the brakes are not shown as it would be of a conventional type which supplies fluid under pressure to the hose 73 when the brakes are to be operated.

The spool valve 72 is provided with a sliding valve member 76 axially movable within the spool valve and biased toward the right as shown in Figure 3 by a spring 77. The proportions of the slide valve member 76 are arranged so that when the valve member is in the right hand position shown, the manifold 71 is in fluid communication with the hose 73 and when the valve member moves to the left, the manifold 71 is isolated from the hose 73 and brought into fluid communication with the hose 74. Therefore, when fluid pressure is supplied to the hose 73, the cylinders 67 will be operated only if the valve member 76 is in the right hand position; but if the valve member 76 moves to the left the brakes are automatically released.

A valve actuating member or inertia member 81 is provided to operate the spool valve 72 and release the brakes whenever skidding occurs. The valve operating member is mounted on the wheel 21 by a threaded connection 82 so that relative rotation between the valve actuating member and the wheel in one direction moves it to the right and relative rotation in the other direction causes the valve actuating member to move to the left. A circumferential slot 83 (shown in Figures 4 and 5) is formed in the valve actuating member 81 and is adapted to receive the end of a stop pin 84 which is anchored on the wheel 21. This stop mechanism permits the valve actuating member 81 to move relative to the wheel 21 only a limited amount determined by the length of the circumferential slot 83. A spring 86 extending between the stop pin 84 and a spaced lug 87 biases the valve actuating member 81 toward one extreme position of its travel relative to the wheel 21.

The direction of the lead of the threads 82 and the biasing of the spring 86 are arranged so that under normal braking operation the valve actuating member 81 will be in the right hand position shown in Figure 3. However, if the wheel 21 is rotating in the forward direction and starts to slide there will be rapid deceleration of the wheel. The rotating inertia of the valve actuating member 81 will cause it to overcome the friction of the threads 82 and the biasing force of the spring 86 so that it will not decelerate at the same rate as the wheel under skidding conditions. This will produce relative rotation between the valve actuating member 81 and the wheel 21 and will cause the valve actuating member to be threaded to the left. The valve member 76 is provided with a roller 88 which engages the valve actuating member 81 and when the valve actuating member 81 moves to the left the roller 88 will move the valve member 76 to the left thereby releasing the brakes to eliminate the skidding. As soon as the skidding of the wheel 21 ceases and the wheel returns to its rotating condition, the valve actuating member 81 will move back to the right under the force of the spring 86 and the brakes will be reapplied.

Those skilled in the art will recognize that this mechanism automatically prevents skidding thereby producing maximum braking for any surface. When the brakes are applied, any tendency of the brakes to grab or operate in a violent manner will be cushioned by the liquid springs 34 and 47 because they permit limited rotation of the mounting members 30 and 31.

In operation, when the brakes are applied, a cushioning effect is created by the liquid springs 34 and 47 which resiliently resist rotation of the mounting members 30 and 31 if the braking force is too great. If skidding occurs the valve actuating member 81 will move to the left thereby causing the valve member 76 to release the brakes and eliminate the skid. As soon as the wheels are rotating properly, the brakes are automatically reapplied and again the liquid springs 34 and 47 cushion the braking operation. It is apparent, therefore, by utilizing a braking system as disclosed, maximum braking may be developed keeping skidding to a minimum as well as producing a brake system which operates without severe grabbing or jerking, thus eliminating unnecessary strains on the entire aircraft structure and improving the comfort of the passengers.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

I claim:

An aircraft landing gear comprising a strut assembly, an axle on said strut assembly, a wheel journalled on said axle for rotation about the axis thereof, a member journalled on said axle for rotation around said axis, a liquid damping spring connected between said member and assembly resiliently resisting rotation thereof in one direction from an extreme position and providing damping resisting rotation thereof in both directions, an annular inertia member mounted on said wheel for limited rotation relative thereto between first and second positions, threads connecting said inertia member and wheel producing relative axial motion therebetween upon relative rotational motion, resilient means connected between said inertia member and wheel resiliently biasing said inertia member toward said first position with a force sufficient to produce a predetermined deceleration of said inertia member, fluid operated brake means operably connected between said member and wheel resisting relative rotation therebetween when applied, valve means connected to said brake means operable to release said brake means, and a follower on said valve means engaging said inertia member operating said valve to release said brake means when the inertia member moves to said second position.

References Cited in the file of this patent
UNITED STATES PATENTS

| | | |
|---|---|---|
| 1,988,986 | Sterns | Jan. 22, 1935 |
| 2,014,903 | Logan | Sept. 17, 1935 |
| 2,107,823 | Hallot | Feb. 8, 1938 |
| 2,163,731 | Hallot | June 27, 1939 |
| 2,299,726 | Baselt et al. | Oct. 27, 1942 |
| 2,333,095 | Dowty | Nov. 22, 1943 |
| 2,523,057 | Ransom | Sept. 19, 1950 |
| 2,533,607 | Neilson et al. | Dec. 12, 1950 |
| 2,560,005 | Shawbrook et al. | July 10, 1951 |
| 2,573,387 | Bush | Oct. 30, 1951 |
| 2,578,200 | Nicholl | Dec. 11, 1951 |
| 2,707,604 | Dowty | May 3, 1955 |
| 2,736,395 | Keeler | Feb. 28, 1956 |